Feb. 12, 1946.  L. M. ARANT  2,394,835
EXPOSURE METER
Filed Sept. 26, 1944
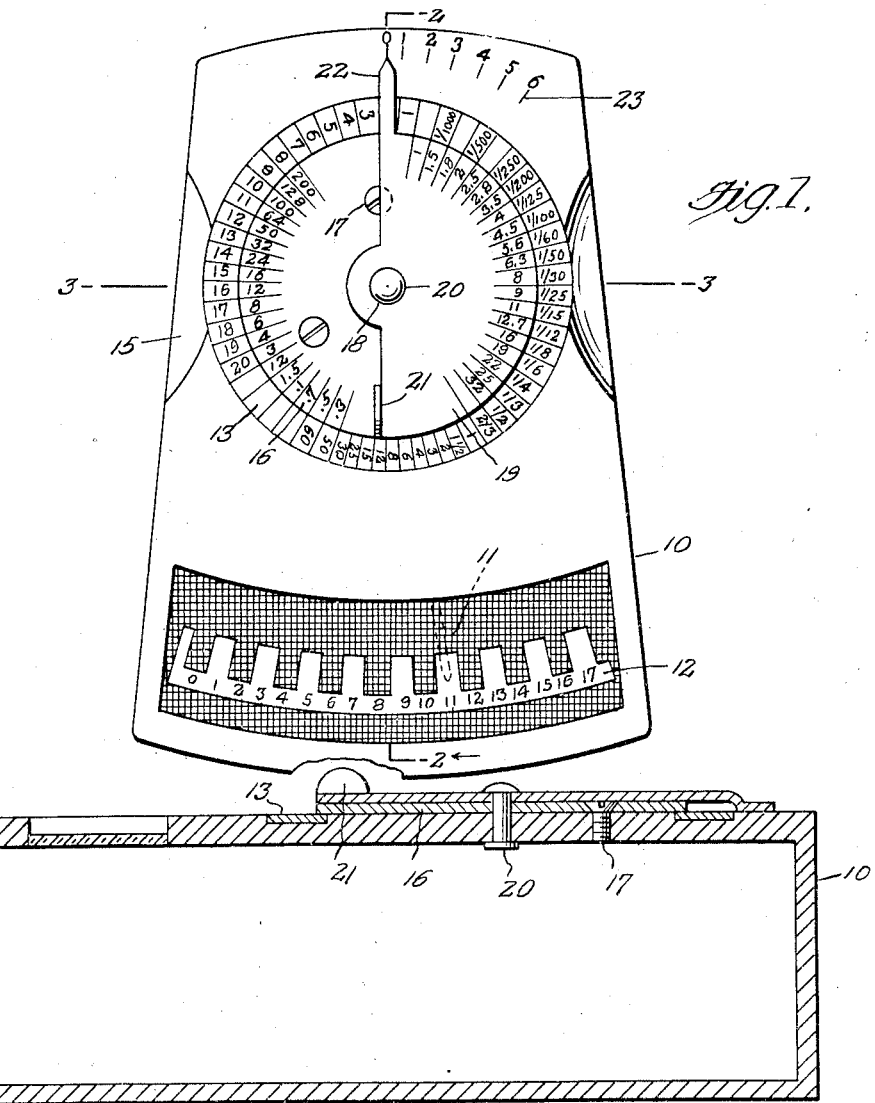
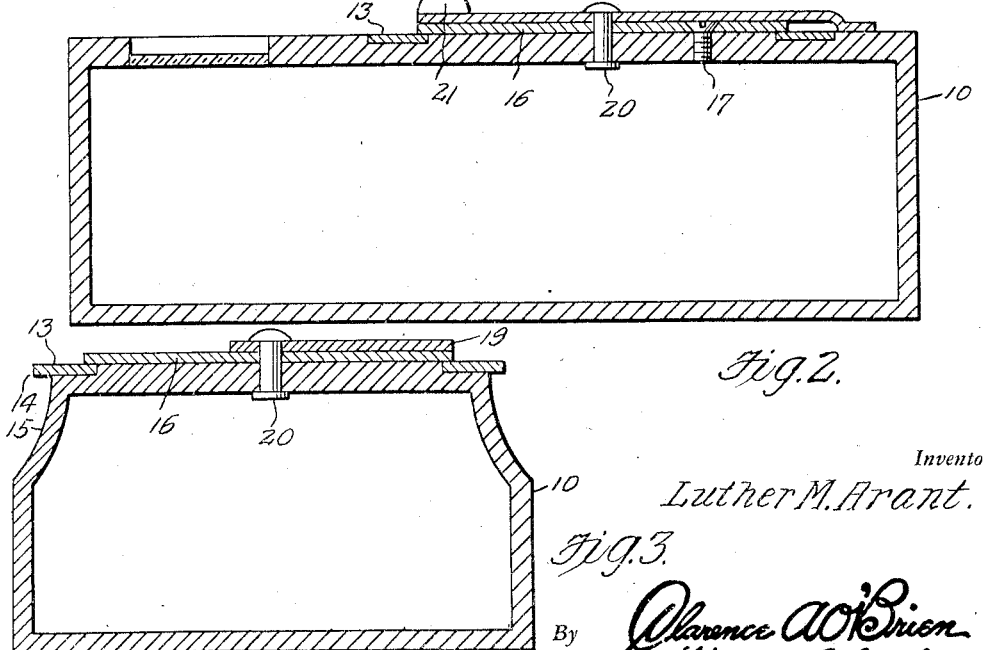
Inventor
Luther M. Arant.
By Clarence A. O'Brien
and Harvey B. Jacobson
Attorneys Patented Feb. 12, 1946

2,394,835

UNITED STATES PATENT OFFICE 2,394,835

EXPOSURE METER

Luther M. Arant, Southern Pines, N. C.

Application September 26, 1944, Serial No. 555,820

1 Claim. (Cl. 235—64.7)

This invention relates to exposure meters for cameras of the type in which the indication of an instrument pointer (such as the pointer moved by the current of a photo-cell) is translated into the data required for the exposure by means of movable scales.

It is an object of the invention to improve exposure meters of the above mentioned type by providing easily operated means permitting to take care of the light absorption due to a filter or another light absorbing appliance without any additional or mental computation.

The invention is illustrated in the accompanying drawing in which:

Figure 1 is a top view of an exposure meter for cameras showing the scale and the window with the pointer.

Figure 2 is a longitudinal section through the instrument along the line 2—2 of Figure 1, those parts of the indicating instrument which are contained in the casing being removed.

Figure 3 is a cross section through the instrument along the line 3—3 of Figure 1, the parts in the interior of the instrument being again removed.

The exposure meter according to the invention consists of a casing 10 enclosing the photo-cell, galvanometer coil, resistance, and other parts pertaining to the indicating instruments which are, however, not shown, merely the pointer 11 playing on a scale 12 being illustrated in Figure 1. Upon this casing 10 the disks carrying the scales required for the computation or indication of the settings of the camera controls are mounted.

The annular disk 13 containing the light values and the shutter speeds is the outermost disk encircling the other disks; it is provided with a milled or knurled edge 14 and may be turned around, using either one of the inner disks or a circular part of the casing as a pivot. In order to be able to seize the annular disk 13 at its periphery with a finger the casing is provided with a depression 15 at both sides over which the knurled edge of the disk 13 protrudes.

Fixedly mounted within the annular disk 13 is the disk 16 carrying the scale indicating the film speed. This disk is screwed to the casing 10 by means of screws 17. The film speed scale occupies only one-half of the disk as shown in Figure 1.

A further disk 19 which is of semi-circular shape is rotatably mounted on said disk 16 by means of a pivot 20 fixed to the casing. Said disk carries the scale of the aperture stops, indicating the so-called relative sizes of the apertures expressed by the ratio between the focal distance of the lens and the diameter of the opening used. This scale has a thumb piece 21 formed by an upturned lug provided on said scale permitting to turn it around the pivot.

The disk 19 carries a pointer 22 playing on a scale 23 which contains the filter factor, which represent the ratio of the volume of light passing through a perfectly transparent opening to that passing through the same opening when covered by a filter. The disk indicating the stops to be selected may thus be readjusted in accordance with the absorption of light due to the filter. This readjustment without any additional mental computation will immediately provide the necessary data for setting the controls of the camera.

When operating the exposure meter, the indications made by the pointer 11 on scale 12 which correspond to the prevailing light conditions are translated into the data permitting the setting of the controls of the camera by means of the movable and fixed scales mounted on the instrument.

Assuming a film speed of 64 to correspond to the type of film with which the exposure is made, the first operation consists in bringing the light value indicated by the pointer (#11) into alignment with the selected film speed 64. If a shutter speed of ½₅ of a second is intended to be used the aperture stop of f/9 would have to be selected, as shown in Figure 1; but if in addition, a filter is used, the disk 19 with its pointer 22 is turned by means of the thumb piece 21 until the pointer 22 reaches the mark corresponding to the filter factor characterizing the filter used. Assuming that the filter factor is K2 (the filter factors are usually expressed by the letter K followed by a number indicating the ratio of absorption) the pointer 22 is turned to the mark 2 and the original adjustment will now be corrected and readjusted in conforming with this filter factor. It will now be found, for example, that the aperture stop is f/6.3 and that it is two stops in advance of the stop which would have been selected if no filter had been used.

It will, therefore, be seen that the invention resides mainly in making one of the scales preferably that indicating the aperture stops independently adjustable in accordance with the filter factor, thus taking into account the absorption of light due to the filter.

What I claim is:

In a calculator for use in connection with exposure meters of the light value indicating type, a supporting base, an outer annular rotatable scale carrying disk provided with an annular light value and an annular shutter speed scale, inner circular portions concentric with the first mentioned disk, divided into two independent sections, one section being fixed to the supporting base and carrying a film emulsion speed scale, the other section being rotatable and carrying a relative aperture scale, said last named section being also provided with means for hand operation and with an indicator bridging the surrounding annular scale, and a fixed filter factor scale arranged on said supporting base for cooperation with said indicator.

LUTHER M. ARANT.